(12) United States Patent  
Kataoka et al.

(10) Patent No.: US 10,370,029 B2  
(45) Date of Patent: Aug. 6, 2019

(54) STEERING CONTROL APPARATUS

(71) Applicant: DENSO CORPORATION, Kariya, Aichi-pref. (JP)

(72) Inventors: Motoaki Kataoka, Kariya (JP); Yosuke Hirate, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 66 days.

(21) Appl. No.: 15/653,327

(22) Filed: Jul. 18, 2017

(65) Prior Publication Data

US 2018/0022384 A1   Jan. 25, 2018

(30) Foreign Application Priority Data

Jul. 20, 2016 (JP) .................................. 2016-142213

(51) Int. Cl.
| | |
|---|---|
| *B62D 5/00* | (2006.01) |
| *B62D 6/00* | (2006.01) |
| *B62D 6/04* | (2006.01) |
| *B62D 6/10* | (2006.01) |
| *G01L 5/00* | (2006.01) |
| *B62D 5/04* | (2006.01) |
| *G01L 5/22* | (2006.01) |

(52) U.S. Cl.
CPC ............. *B62D 6/10* (2013.01); *B62D 5/0472* (2013.01); *B62D 6/04* (2013.01); *B62D 6/008* (2013.01); *G01L 5/221* (2013.01)

(58) Field of Classification Search
CPC . B62D 6/00; B62D 6/008; B62D 6/04; B62D 6/10; B62D 5/00; B62D 5/04; B62D 5/0472; G01L 5/00; G01L 5/221
See application file for complete search history.

(56) References Cited

U.S. PATENT DOCUMENTS 8,055,409 B2 * 11/2011 Tsuchiya ................ B62D 1/286  
  701/1  
9,387,875 B2 *  7/2016 Shimizu ............... B62D 5/0463  
(Continued)

FOREIGN PATENT DOCUMENTS

| JP | 2002-369565 | 12/2002 |
|---|---|---|
| JP | 2014-031103 A | 2/2014 |

(Continued)

*Primary Examiner* — Yonel Beaulieu  
(74) *Attorney, Agent, or Firm* — Knobbe, Martens, Olson & Bear, LLP

(57) ABSTRACT

A steering control apparatus controls an assistance torque outputted by a motor connected to a steering system mechanism that generates a steering torque. In the steering control apparatus, a load calculating unit estimates or detects a load acting on a steering shaft of the steering system mechanism. A target steering torque calculating unit calculates a target steering torque that is a target value of the steering torque, based on the estimated or detected load. A servo controller calculates a command value of the assistance torque such that a torque deviation that is a difference between the steering torque and the target steering torque is zero. A band correcting unit includes a band correction filter that extracts a component of a specific frequency band during a process of calculation from the load to the target steering torque, and corrects a gain of a predetermined transfer function at the extracted band.

11 Claims, 12 Drawing Sheets

(56) References Cited

U.S. PATENT DOCUMENTS

| | | | |
|---|---|---|---|
| 2001/0023382 A1 | 9/2001 | Kurishige et al. | |
| 2007/0021889 A1* | 1/2007 | Tsuchiya | B62D 1/286 |
| | | | 701/41 |
| 2010/0228440 A1* | 9/2010 | Yamazaki | B62D 5/0466 |
| | | | 701/41 |
| 2012/0046832 A1* | 2/2012 | Kariatsumari | B62D 5/046 |
| | | | 701/41 |
| 2012/0199414 A1* | 8/2012 | Shimizu | B62D 5/0463 |
| | | | 180/446 |
| 2013/0049652 A1* | 2/2013 | Namikawa | H02P 6/00 |
| | | | 318/400.02 |
| 2013/0060427 A1 | 3/2013 | Kataoka et al. | |
| 2015/0210310 A1 | 7/2015 | Akatsuka et al. | |
| 2015/0251691 A1 | 9/2015 | Tamaizumi et al. | |
| 2017/0015351 A1* | 1/2017 | Endo | B62D 6/00 |
| 2017/0088174 A1* | 3/2017 | Inoue | B60T 8/1755 |
| 2017/0137056 A1 | 5/2017 | Aoki et al. | |
| 2018/0009465 A1* | 1/2018 | Aoki | B62D 1/04 |
| 2018/0118253 A1* | 5/2018 | Minamiguchi | B62D 5/0463 |

FOREIGN PATENT DOCUMENTS

| | | |
|---|---|---|
| JP | 5533822 B2 | 6/2014 |
| JP | 2014-237375 | 12/2014 |
| JP | 2015-033941 | 2/2015 |
| JP | 2015-168346 A | 9/2015 |
| JP | 2016-049803 | 4/2016 |

* cited by examiner

FILTER CHARACTERISTICS OF BANDPASS FILTER

TRANSMISSION CHARACTERISTICS FROM STEERING WHEEL TORQUE TO STEERING TORQUE

TRANSMISSION CHARACTERISTICS FROM STEERING WHEEL TORQUE TO STEERING TORQUE

TRANSMISSION CHARACTERISTICS FROM DISTURBANCE TORQUE FROM WHEEL TO STEERING TORQUE

STEERING ANGLE-STEERING TORQUE LISSAJOUS WAVEFORM

— NO BAND CORRECTED (COMPARISON EXAMPLE)
---- BAND CORRECTION FOR ESTIMATED LOAD (FIRST EMBODIMENT)
—·— BAND CORRECTION FOR TARGET STEERING TORQUE (SECOND EMBODIMENT)

STEERING CONTROL APPARATUS

CROSS-REFERENCE TO RELATED APPLICATION

This application is based on and claims the benefit of priority from Japanese Patent Application No. 2016-142213, filed Jul. 20, 2016. The entire disclosure of the above application is incorporated herein by reference.

BACKGROUND

[Technical Field]

The present disclosure relates to a steering control apparatus.

[Related Art]

Steering control apparatuses calculate an assistance amount by controlling a steering torque to match a target steering torque calculated based on load. Among the steering control apparatuses, a steering control apparatus that compensates the assistance amount is known.

For example, Japanese Patent Publication No. 5533822 discloses an electric power steering control apparatus in which basic compensation amounts calculated by a plurality of basic compensation amount calculating means are weighted and added. An assistance compensation amount is thereby generated. A basic assistance amount is then corrected based on the generated assistance compensation amount.

JP-A-2015-168346 discloses an electric power steering apparatus in which a reverse input that acts on a steering wheel from a wheel side is detected or estimated. A frequency component of a specific band of the reverse input is extracted. Then, a phase of the extracted specific frequency component is adjusted, and a compensation component for an assistance component is calculated based on the reverse input. As a result, the reverse input is transmitted to a steering mechanism such that, of the reverse input, road-surface information, such as a road-surface reaction force, is amplified as necessary information and disturbances, such as braking vibrations, are suppressed as unnecessary information.

In the apparatus in Japanese Patent Publication No. 5533822, the weight at each frequency band is adjusted for a plurality of frequency characteristics. As a result, characterization of a vehicle can be arbitrarily performed. However, to achieve desired characteristics, the use of a high-order filter, as well as a high level of skills in design and adaptation, is required.

In addition, the frequency at which transmission characteristics are to be changed and a center frequency of a bandpass filter at which weighting and addition are to be performed do not necessarily match. Furthermore, the degree of change in the transmission characteristics differs based on the amount of the main assistance component, that is, the weight.

In the apparatus in JP-A-2015-168346, the compensation amount calculated to amplify only the necessary reverse input component is added to the assistance component, and the result is transmitted to the steering mechanism. However, as disclosed in FIG. 4 of JP-A-2014-31103, for example, the transmission characteristics from a wheel to a steering wheel significantly changes based, not only on the specifications of the mechanism, but also assistance control. Therefore, phase design and adaptation matching the senses of a driver not easy to perform.

SUMMARY

It is thus desired to provide a steering control apparatus that easily actualizes transmission characteristics matching the senses of a driver based on load information.

The present disclosure relates to a steering control apparatus that controls an assistance torque outputted by a motor connected to a steering system mechanism that generates a steering torque.

The steering control apparatus includes a load calculating unit, a target steering torque calculating unit, a servo controller, and a band correcting unit.

The load calculating unit estimates or detects a load acting on a steering shaft of the steering system mechanism.

The target steering torque calculating unit calculates a target steering torque that is a target value of the steering torque, based on the estimated or detected load.

The servo controller calculates a command value of the assistance torque such that a torque deviation that is a difference between the steering torque and the target steering torque is zero. The servo controller corresponds to an assistance controller in Japanese Patent Publication No. 5533822.

The band correcting unit includes a band correction filter that extracts a component of a specific frequency band during a process of calculation from the load to the target steering torque. The band correcting unit corrects a gain of a predetermined transfer function in a band extracted by the band correction filter. As a result, the band correcting unit amplifies or suppresses the transmission characteristics at a specific band.

The predetermined transfer function that is arbitrarily selected includes, for example, a transfer function from a steering wheel torque to a steering torque and transmission characteristics from a disturbance torque from a wheel to a steering torque.

Specifically, the band correcting unit may be provided between an output side of the load calculating unit and an input side of the target steering torque calculating unit. The band correcting unit may perform band correction for the load. Alternatively, the band correcting unit may be provided on an output side of the target steering torque calculating unit. The band correcting unit may perform band correction for the target steering torque. In both aspects, the transmission characteristics from the steering wheel torque to the steering torque can be easily adjusted to desired characteristics. Consequently, transmission characteristics matching the senses of a driver can be easily actualized based on load information.

A concept of the present disclosure is to aim to adjust transmission feel, based on the transmission feel, that is, the sensory experience depending on the manner in which load information is transmitted as steering torque. As a result of the above-described configuration, unlike the related art in JP-A-2015-168346, the present disclosure can favorably change the transmission characteristics from the load to the steering torque, for example, by simply changing the gain at a specific band, without requiring phase adjustment.

In addition, the band correcting unit preferably uses one or more quadratic filters (typically bandpass filters) having a center frequency in the specific frequency band as the band correction filter. As a result, the frequency can be more easily targeted and adaptation is facilitated.

DESCRIPTION OF THE EMBODIMENTS

A plurality of embodiments of a steering control apparatus will hereinafter be described with reference to the drawings. According to each embodiment, an ECU serving as the steering control apparatus is applied to an electric power steering system of a vehicle. The ECU outputs an assistance torque command to a motor that generates a steering assistance torque. Configurations that are essentially identical among the plurality of embodiments are given the same reference numbers. Descriptions thereof are omitted. In addition, hereafter, a first embodiment and a second embodiment are collectively referred to as a present embodiment.

[Configuration of an Electric Power Steering System]

Figure 1:
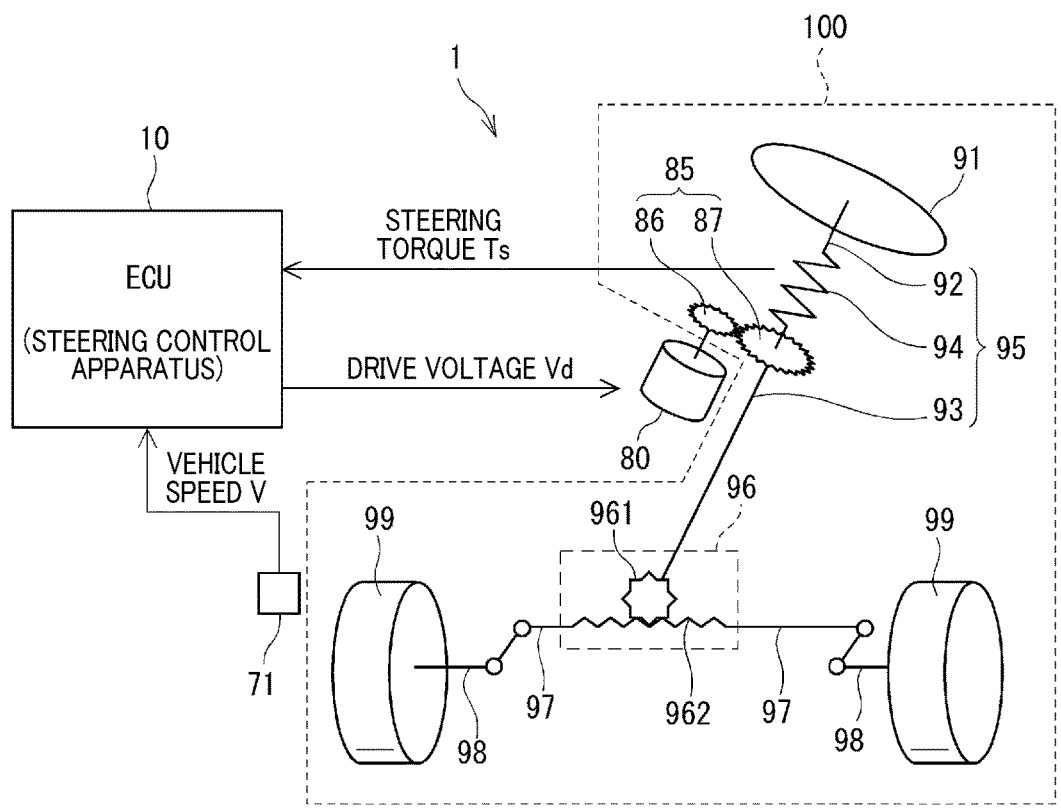
FIG. 1 is an overall configuration diagram of an electric power steering system.

As shown in FIG. 1, an electric power steering system 1 uses a motor 80 to assist a driver in operating a steering wheel 91.

The steering wheel 91 is fixed to one end of a steering shaft 92. An intermediate shaft 93 is provided on the other end side of the steering shaft 92. A torque sensor 94 is provided between the steering shaft 92 and the intermediate shaft 93. The steering shaft 92 and the intermediate shaft 93 are connected by a torsion bar of the torque sensor 94. Hereafter, an overall shaft from the steering shaft 92, through the torque sensor 94, to the intermediate shaft 93 is collectively referred to as a steering shaft section 95.

The torque sensor 94 detects a steering torque Ts. The torque sensor 94 has the torsion bar that connects the steering shaft 92 and the intermediate shaft 93. The torque sensor 94 detects a torque applied to the torsion bar based on an angle of torsion of the torsion bar. A detection value of the torque sensor 94 is outputted to the ECU 10 as a detection value related to the steering torque Ts.

A gear box 96 is provided in an end portion of the intermediate shaft 93 on the side opposite the torque sensor 94. The gear box 96 includes a pinion gear 961 and a rack 962. The pinion gear 961 is provided in the end portion of the intermediate shaft 93 on the side opposite the torque sensor 94. The pinion gear 961 meshes with teeth on the rack 962. When the driver turns the steering wheel 91, the pinion gear 961 rotates together with the intermediate shaft 93. The rack 962 moves leftward or rightward in accompaniment with the rotation of the pinion gear 961.

Tie rods 97 are provided on both ends of the rack 962. The tie rods 97 move leftward and rightward in a reciprocating manner, together with the rack 962. Each tie rod 97 is connected to a wheel 99 via a knuckle arm 98. An orientation of the wheel 99 changes as a result of the tie rod 97 pulling and pushing the knuckle arm 98.

For example, the motor 80 is a three-phase brushless alternating-current motor. The motor 80 outputs an assistance torque based on a drive voltage Vd outputted from the ECU 10. The assistance torque assists with a steering force of the steering wheel 91. In the case of the three-phase alternating-current motor, the drive voltage Vd refers to a phase voltage of each phase, that is, a U phase, a V phase, and a W phase. A rotation of the motor 80 is transmitted to the intermediate shaft 93 via a reduction mechanism 85.

The electric power steering system 1 shown in FIG. 1 is a column-assisted type in which the rotation of the motor 80 is transmitted to the steering shaft section 95. However, the ECU 10 according to the present embodiment can be similarly applied to a rack-assisted-type electric power steering system or a steer-by-wire system. In the steer-by-wire system, the steering wheel and steered wheels are mechanically separated. In addition, according to another embodiment, a multiple-phase alternating-current motor that has a number of phases other than three, or a brushed direct-current motor may be used as the steering assistance motor.

The reduction mechanism 85 has a worm gear 86 and a worm wheel 87. The worm gear 86 is provided at the tip of a rotation shaft of the motor 80. The worm wheel 87 is provided on the same axis as the intermediate shaft 93 in a state of meshing with the worm gear 86. As a result, the rotation of the motor 80 is transmitted to the intermediate shaft 93. In addition, when the intermediate shaft 93 rotates as a result of steering of the steering wheel 91 or by a reaction force from a road surface, the rotation is transmitted to the motor 80 via the reduction mechanism 85. The motor 80 thereby rotates.

Figure 3:
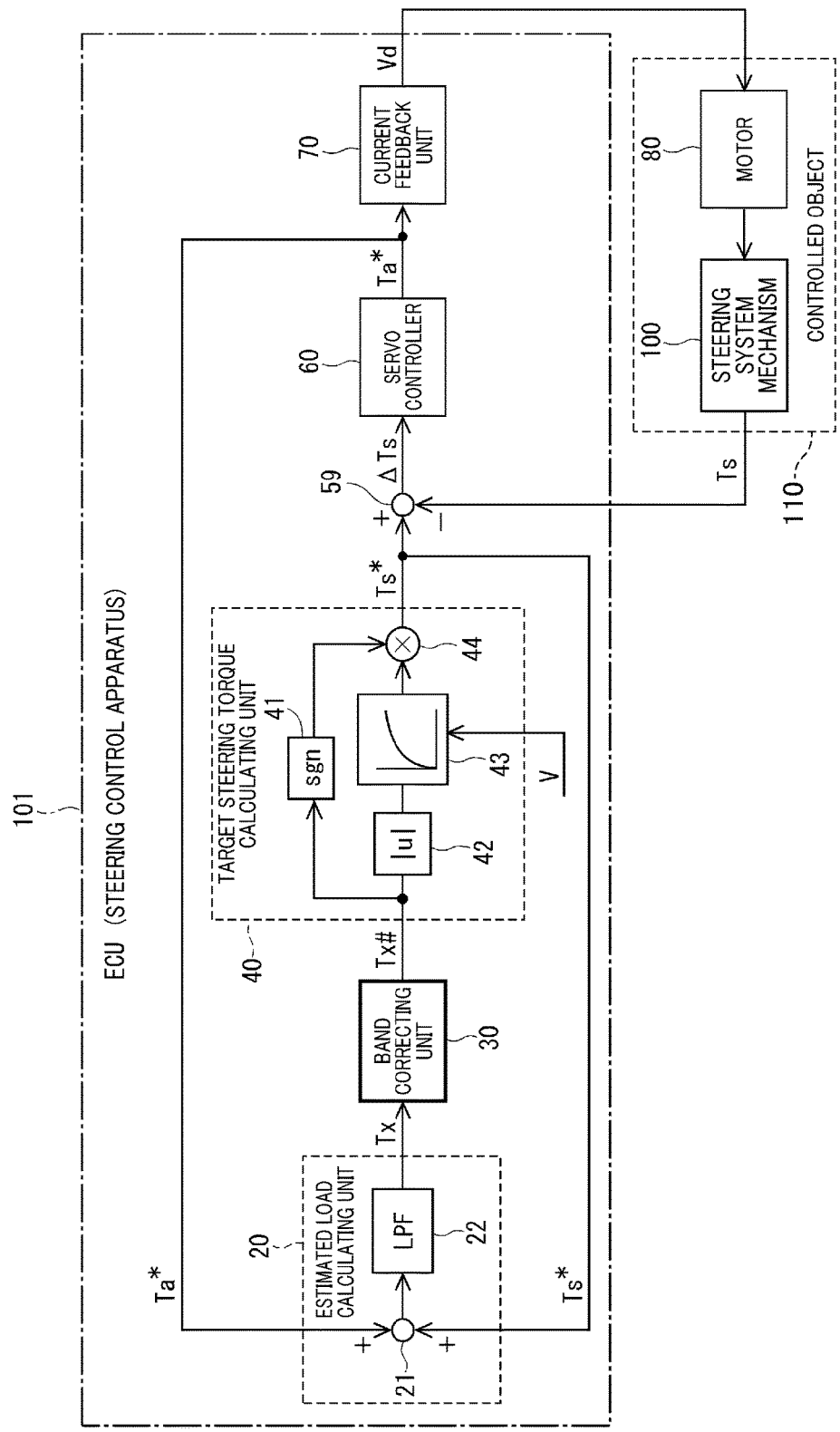
FIG. 3 is a configuration diagram of an electronic control unit (ECU) (steering control apparatus) according to a first embodiment.

Here, an overall mechanism from the steering wheel 91 to the wheels 99 by which the steering force of the steering wheel 91 is transmitted is referred to as a steering system mechanism 100. The ECU 10 controls the steering torque Ts generated by the steering system mechanism 100 by controlling the assistance torque outputted by the motor 80 that is connected to the steering system mechanism 100. As shown in FIG. 3, in the present specification, the motor 80 and the steering system mechanism 100 are considered to be a controlled object 110 of the ECU 10. In addition, a vehicle speed sensor 71 is provided in a predetermined section of the vehicle. The vehicle speed sensor 71 detects a vehicle speed V.

The ECU 10 is operated by electric power received from an on-board battery (not shown). The ECU 10 calculates an assistance torque command Ta* based on the steering torque Ts detected by the torque sensor 94, the vehicle speed V detected by the vehicle speed sensor 71, and the like. Then, the ECU 10 applies the drive voltage Vd calculated based on the assistance torque command Ta* to the motor 80, thereby making the steering system mechanism 100 generate the steering torque Ts.

The various calculation processes performed by the ECU 10 may be software processes actualized by a central processing unit (CPU) running programs stored in advance in a tangible memory device, such as a read-only memory (ROM). Alternatively, the various calculation processes may be actualized by hardware processes performed by dedicated electronic circuits.

Figure 2:
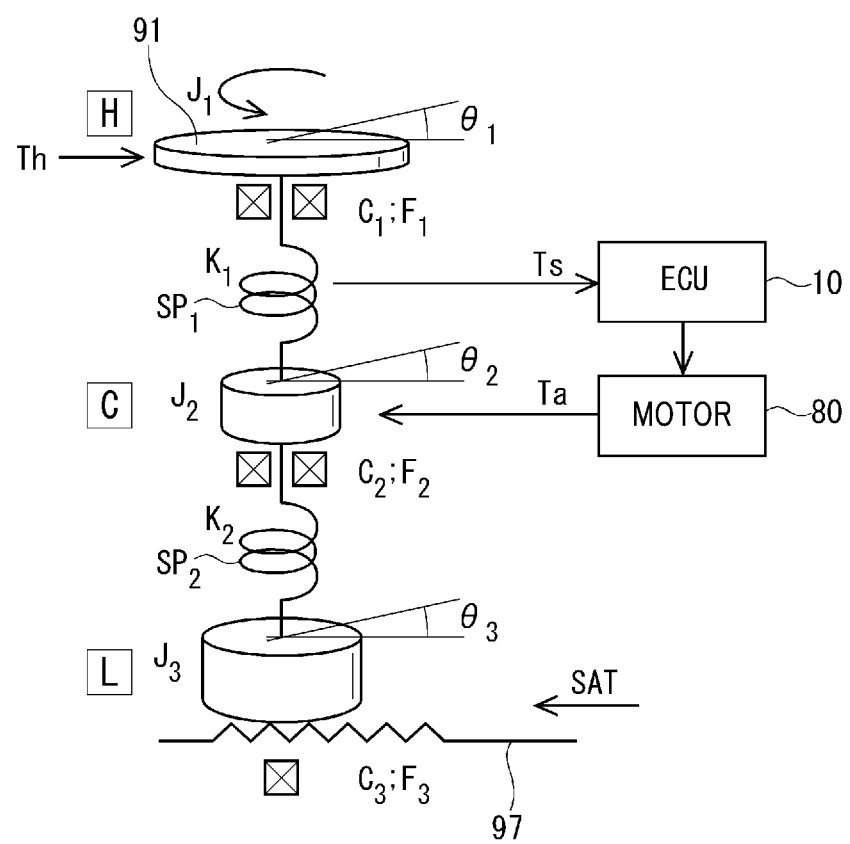
FIG. 2 is a diagram of a model of a steering system mechanism to be controlled.

Here, FIG. 2 will be referenced. FIG. 2 is a diagram of a model of the electric power steering system 1. The model in FIG. 2 includes a steering wheel portion H corresponding to the steering wheel 91, a column portion C, and a load portion L connected to the wheel 99. A steering wheel torque Th is inputted to the steering wheel portion H.

The steering wheel portion H and the column portion C are connected by a spring element $SP_1$. The spring element $SP_1$ has a torsion spring coefficient $K_1$ and corresponds to the torsion bar of the torque sensor 94. The ECU 10 acquires the steering torque Ts detected based on the torsion of the torsion bar. The assistance torque Ta outputted by the motor 80 based on a command from the ECU 10 acts on the column portion C.

The column portion C and the load portion L are connected by a spring element $SP_2$. The spring element $SP_2$ has a torsion spring coefficient $K_2$ and corresponds to the intermediate shaft 93. A self-aligning torque SAT is inputted to the load portion L from the wheel 99 side. In addition, a disturbance torque from the wheel 99 may also be inputted to the load portion L.

Furthermore, symbol J denotes moment of inertia, symbol C denotes viscous friction coefficient, symbol F denotes static frictional force, and symbol θ denotes rotation angle. Suffixes 1, 2, and 3 attached to the symbols respectively indicate that the amount is for the steering wheel portion H, the column portion C, and the load portion L.

In this model, a load Tx is expressed by the following formula 1.

$$T_x = T_s + T_a \quad \text{[Formula 1]}$$
$$= SAT + J_2 \ddot{\theta}_2 + C_2 \dot{\theta}_2 + J_3 \ddot{\theta}_3 + C_3 \dot{\theta}_3 +$$
$$F_2 \text{sgn}(\dot{\theta}_2) + F_3 \text{sgn}(\dot{\theta}_3)$$

That is, the load Tx is expressed by a sum of the steering torque Ts and the assistance torque Ta. The steering torque Ts may be a target steering torque Ts* calculated by the ECU 10 or the detection value of the torque sensor 94. The assistance torque Ta may be the assistance torque command Ta* calculated by the ECU 10 or an actual torque of the motor 80. In addition, a main component of the load Tx is the self-aligning torque SAT.

Japanese Patent Publication No. 5533822 discloses a steering control apparatus in which basic compensation amounts calculated by a plurality of basic compensation amount calculating means are weighted and added. An assistance compensation amount is thereby generated. A basic assistance amount is then corrected based on the generated assistance compensation amount.

In addition, JP-A-2015-168346 discloses a steering control apparatus in which a frequency component of a specific band of a reverse input is extracted. A phase of the extracted specific frequency component is adjusted, and a compensation component for an assistance component is calculated based on the reverse input.

However, in the apparatus disclosed in Japanese Patent Publication No. 5533822, a high-order filter is required for appropriate adjustment of weighting to actualize transmission characteristics that match the senses of the driver. Providing the high-order filter is difficult. Even should the concept of extracting a specific frequency component of a reverse input in JP-A-2015-168346 be applied to the apparatus disclosed in Japanese Patent Publication No. 5533822, the fact that the apparatus compensates the assistance amount remains unchanged.

Therefore, to enable suppression or actualization of transmission of road-surface information at a specific frequency band through changes being made to the assistance amount, a model related to the transmission of road-surface information is required. Consequently, phase adjustment such as that in the technology disclosed in JP-A-2015-168346 is required.

Here, to solve such issues of the related arts, the ECU 10 according to the present embodiment is characterized by including a band correcting unit. The band correcting unit corrects a gain of the transmission characteristics at a specific frequency band in the process of calculation from the load Tx to the target steering torque Ts*. An object according to the present embodiment is to easily actualize transmission characteristics that match the senses of the driver, based on information on the load Tx, through band correction performed by the band correcting unit.

That is, unlike the technology disclosed in JP-A-2015-168346, the aim according to the present embodiment is not to simply differentiate between necessary information and unnecessary information of the reverse input. The load Tx includes the dynamics of the mechanical system that change in accompaniment with steering, in addition to the self-aligning torque SAT that is the main component. The concept according to the present embodiment is to aim to adjust transmission feel, based on the transmission feel, that is, the sensory experience depending on the manner in which the information of the reverse input is transmitted.

[Configuration of ECU and Working Effects]

Next, specific configurations and working effects of the ECU 10 according to the present embodiment will be described. The ECU 10 according to the present embodiment is largely separated into the ECU 10 according to the first embodiment and the ECU 10 according to the second embodiment, based on the position in which the band correcting unit is provided. Hereafter, 1 and 2 are respectively added as a third digit to 10 as the reference numbers of the ECU according to the first embodiment and the second embodiment. The ECU 101 and the ECU 102 are described in this order.

(First Embodiment)

The first embodiment will be described with reference to FIGS. 3 to 8.

As shown in FIG. 3, the ECU 101 according to the first embodiment includes an estimated load calculating unit 20, a target steering torque calculating unit 40, a deviation calculator 59, a servo controller 60, a current feedback (FB in FIG. 3) unit 70, and the like. According to the present embodiment, the estimated load calculating unit 20 that serves as a load calculating unit does not directly detect the load, but rather, calculates the load Tx through estimation.

In addition, according to the first embodiment, a band correcting unit 30 is provided between an output side of the estimated load calculating unit 20 and an input side of the target steering torque calculating unit 40.

The estimated load calculating unit 20 includes an adder 21 and a low-pass filter (LPF in FIG. 3) 22. In the example shown in FIG. 3, the adder 21 adds the assistance torque command Ta* and the target steering torque Ts*. The low-pass filter 22 extracts a component of a predetermined frequency, such as a band of 10 Hz and higher, from the sum of the assistance torque command Ta* and the target steering torque Ts*. The estimated load calculating unit 20 outputs the frequency component extracted by the low-pass filter 22 as the estimated load Tx.

The band correcting unit 30 corrects the gain of the transmission characteristics at a specific frequency band for the estimated load Tx estimated by the estimated load calculating unit 20. The band correcting unit 30 then outputs a post-band-correction estimated load Tx# to the target steering torque calculating unit 40. In the present specification, # is used as a symbol that indicates a value after the band correction. A detailed configuration of the band correcting unit 30 will be described hereafter.

The target steering torque calculating unit 40 calculates the target steering torque Ts* based on the inputted post-band-correction estimated load Tx# and the vehicle speed V. The target steering torque Ts* is a target value of the steering torque Ts.

Specifically, the target steering torque calculating unit 40 includes a sign determining unit (sgn in FIG. 3) 41, an absolute value determining unit (|u| in FIG. 3) 42, a map referencing unit 43, and a multiplier 44. Here, positive and negative loads Tx are defined by a rotation direction of the steering shaft section 95. A map of a relationship between the load Tx and the target steering torque Ts* is set symmetrically in relation to the positive and negative of the load Tx. The map referencing unit 43 references only the region of positive load Tx in the map of the relationship between the load Tx and the target steering torque Ts*.

Figure 4:
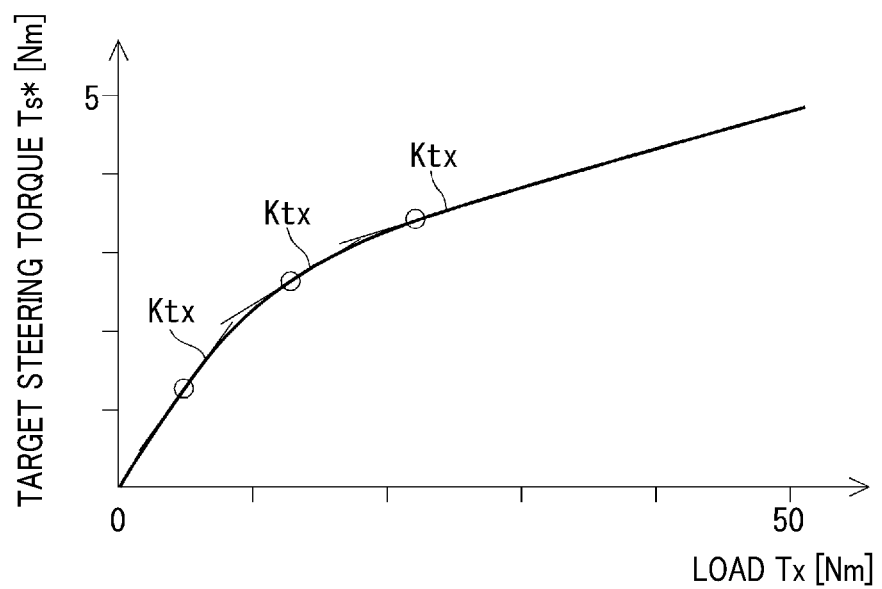
FIG. 4 is a map of a relationship between load and target steering torque.

An example of the target steering torque map referenced by the map referencing unit 43 is shown in FIG. 4. The target steering torque Ts* has a positive correlation with the load Tx. The target steering torque Ts* logarithmically increases as the load Tx increases. A gradient Ktx of a tangent at each operating point on the map becomes greater as the operating point becomes closer to the point of origin. The gradient Ktx becomes more gradual as the load Tx increases.

The sign determining unit 41 determines whether the inputted post-band-correction estimated load Tx# is positive or negative, that is, determines the sign based on the rotation direction of the steering shaft section 95. The absolute value determining unit 42 determines an input u, that is, an absolute value of the post-band-correction estimated load Tx#. Then, the multiplier 44 multiplies the absolute value of the target steering torque Ts* referenced by the map referencing unit 43 based on the absolute value of the load Tx#, by the sign based on the rotation direction of the steering shaft section 95.

The deviation calculator 59 calculates a torque deviation ΔTs (=Ts*−Ts) that is the difference between the steering torque Ts detected by the torque sensor 94 and the target steering torque Ts*.

The servo controller 60 corresponds to an assistance controller in Japanese Patent Publication No. 5533822. The servo controller 60 performs servo control such that the torque deviation ΔTs becomes zero, that is, the steering torque Ts follows the target steering torque Ts*, and calculates the assistance torque command Ta*.

The current feedback unit 70 applies the drive voltage Vd to the motor 80 such that an assistance torque based on the assistance torque command Ta* is applied to the steering shaft section 95, particularly further towards the wheel 99 side than the torque sensor 94. Specifically, the current feedback unit 70 includes a current feedback control circuit, a drive circuit, and a power conversion circuit, such as an inverter.

The current feedback circuit calculates a target current to be sent to each phase of the motor 80, based on the assistance torque command Ta. The current feedback circuit then performs feedback of the actual current in relation to the target current, thereby calculating each phase voltage command. The drive circuit issues drive signals for operating switches of the inverter by pulse width modulation (PWM) control or the like, based on the voltage commands. The inverter performs switching operations based on the plurality of drive signals. The inverter thereby converts electric power inputted from a battery or the like, and outputs the drive voltage Vd such that the desired assistance torque is generated by the steering shaft section 95. Technology regarding such current feedback control is known technology in the field of motor control. Therefore, detailed descriptions thereof are omitted.

Next, FIG. 5 shows a detailed configuration of the band correcting unit 30.

Figure 5A:
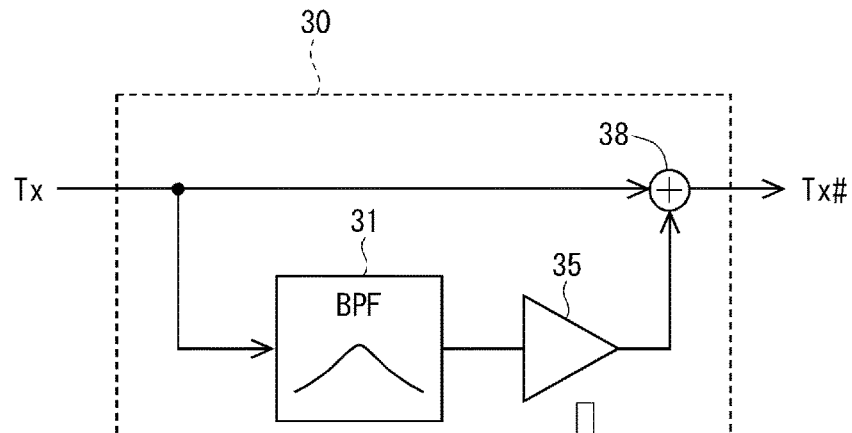
FIGS. 5A and 5B are detailed configuration diagrams of a band correcting unit.

In simple terms, as shown in FIG. 5A, the band correcting unit 30 includes a bandpass filter 31, a gain calculator 35, and an adder 38. The bandpass filter 31 functions as a band correction filter that extracts a component of a specific frequency band. The band correcting unit 30 corrects the gain of a predetermined transmission function in the band extracted by the band correction filter. Here, as the predetermined transmission function that is arbitrarily selected, first, a transmission function from the steering wheel torque to the steering torque is presumed.

According to the present embodiment, the bandpass filter 31 is used as the band correction filter. The bandpass filter 31 is a quadratic filter that has a center frequency within a specific frequency band. The bandpass filter 31 extracts the frequency components of the band near the center frequency and allows these frequency components to pass.

According to the present embodiment, mounting is facilitated through use of the quadratic filter. In addition, as a result of the quadratic filter being used, the gain to be corrected can be made variable by a single constant. That is, unlike high-order transmission functions used in the related arts, such as in Japanese Patent Publication No. 5533822, there is no need to change a plurality of calculation constants. Therefore, vehicle adaptation can be easily performed by only the single constant within the mounted program being changed. The band correcting unit 30 may correct the gain of the transmission characteristics at a plurality of bands using a plurality of bandpass filters as the band correction filters.

Figure 6:
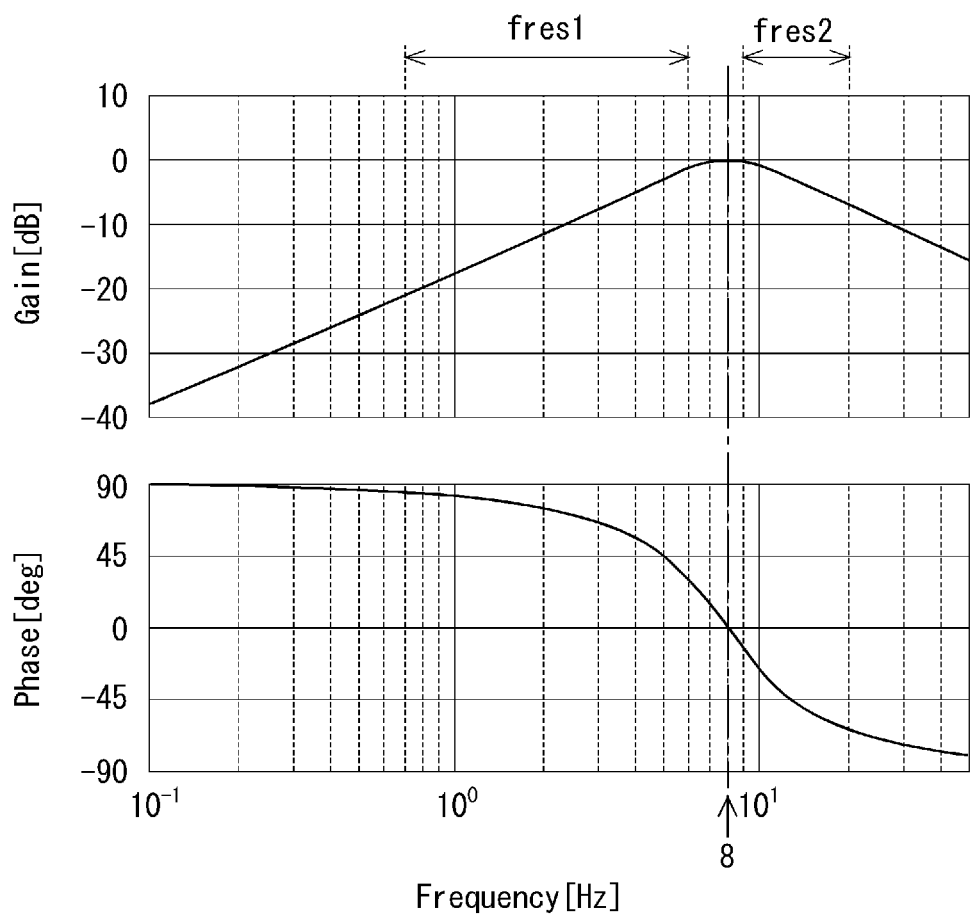
FIG. 6 is a frequency characteristics diagram of a band-pass filter serving as a band correction filter.

FIG. 6 shows an example of filter characteristics of the bandpass filter 31 regarding gain and phase. A quadratic transfer function G(s) thereof is expressed by the following formula 2 through use of a frequency ω, a Laplace variable s, and a damping ratio ξ.

$$G(s) = \frac{2\zeta\omega s}{s^2 + 2\zeta\omega s + \omega^2} \quad \text{[Formula 2]}$$

In the example of the characteristics shown in FIG. 6, the center frequency of the bandpass filter 31 is set to about 8 Hz. That is, in the band of about 7 Hz to 9 Hz, the gain is substantially 0 [dB]. Therefore, the input is output as is. In the band of about 7 Hz and lower, and the band of about 9 Hz and higher, the gain decreases in the negative direction from 0 [dB] in dB units, as the frequency becomes farther from the center frequency. Input is suppressed to a low level. In addition, towards the lower frequency side from the center frequency, the phase advances to converge on +90 [deg]. Towards the higher frequency side from the center frequency, the phase delays to converge on −90 [deg].

Here, the frequency of 8 Hz corresponds to a frequency from a spring upper resonance frequency that is a frequency of characteristic vibrations caused by motion of a vehicle, to a spring lower resonance frequency that is a frequency of characteristic vibrations of the wheels and a suspension mechanism of a vehicle body. From the spring upper resonance frequency to the spring lower resonance frequency refers to a range including the band of the spring upper resonance frequency and the band of the spring lower resonance frequency.

Specifically, in a structure of a common passenger vehicle in which the wheels and the vehicle body are connected by the suspension mechanism, when the vehicle moves as a result of acceleration, turning, and bumps on a road surface, characteristic vibrations are generated in each of the forward, backward, lateral, upward, and downward directions. The frequency of the characteristic vibrations is the spring upper resonance frequency.

In addition, the wheels 99 held to the vehicle body by the suspension mechanism and the steering system mechanism 100 move together with the vehicle body, thereby generating characteristic vibrations. The frequency of these characteristic vibrations is the spring lower resonance frequency.

As shown in the example in FIG. 6, a spring upper resonance frequency fres1 substantially ranges from 0.7 Hz to 6 Hz. A spring lower resonance frequency fres2 substantially ranges from 9 Hz to 20 Hz. Therefore, according to the present embodiment, the frequency band between the lower limit of the spring upper resonance frequency fres1 and the upper limit of the spring lower resonance frequency fres2, that is, the frequency band near 8 Hz that includes frequencies ranging from 0.7 Hz to 20 Hz is set as the frequency band at which the gain is to be corrected.

For example, paragraphs [0107] and [0108] in Japanese Patent Publication No. 5533822 describe that response feel of a linking mechanism and the like from the steering wheel to the wheels can be adjusted by the characteristics of a specific frequency being corrected. As a result, characterization of the vehicle can be arbitrarily performed.

In a similar manner, according to the present embodiment as well, the feel of connection from the steering wheel to the wheels and the vehicle body can be adjusted by appropriate selection of the frequency at which adjustment is to be performed based on the characteristics of the vehicle.

Figure 5B:
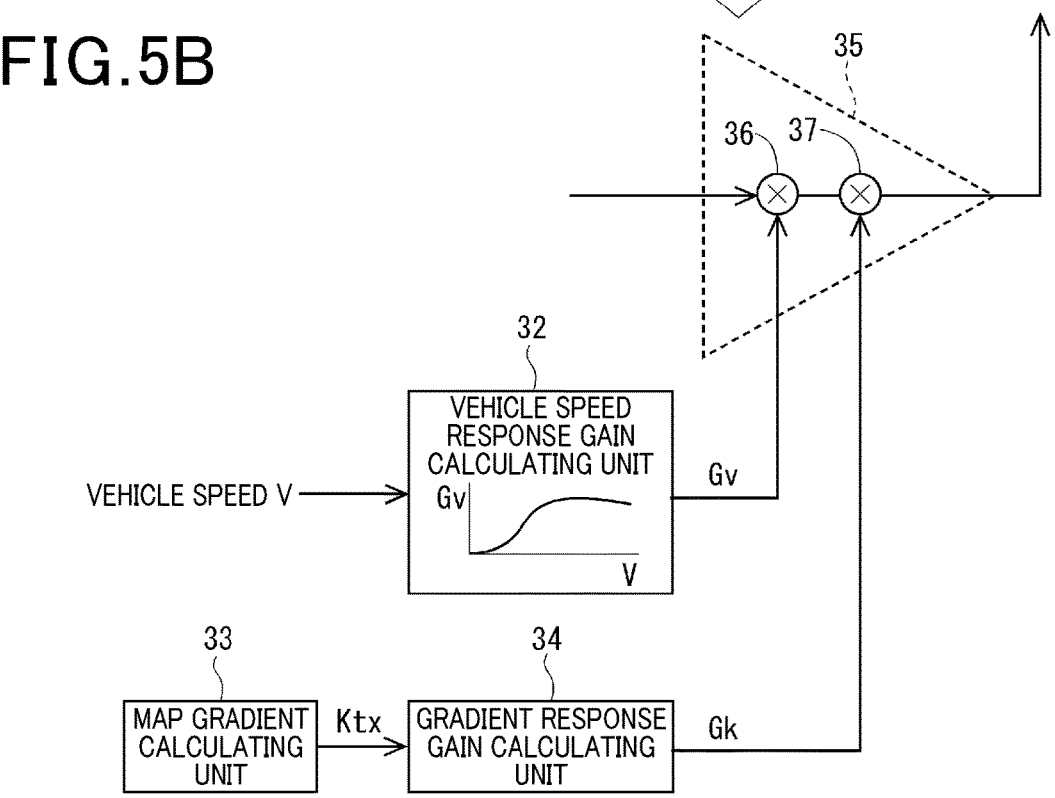

The gain calculator 35 multiplies the output from the bandpass filter 31 by a predetermined gain. For example, as shown in FIG. 5B, the gain calculator 35 is configured by two multipliers 36 and 37 being connected in series to each other.

The multiplier 36 multiplies the output from the bandpass filter 31 by a vehicle-speed response gain Gv. A vehicle-speed response gain calculating unit 32 calculates the vehicle-speed response gain Gv based on the vehicle speed V. As a result, the band correcting unit 30 can adjust the correction amount of the transfer function based on the vehicle speed V and create an optimal steering feel based on the vehicle speed V.

The multiplier 37 multiplies the output from the bandpass filter 31 by a gradient response gain Gk. A gradient response gain calculating unit 34 calculates the gradient response gain Gk based on the gradients Ktx in the target steering torque map successively calculated by the map gradient calculating unit 33.

Referring once again to FIG. 4, the change amount of the target steering torque Ts* when the load Tx is changed in the periphery of a certain operating point is dependent on the map gradient Ktx. That is, in a region in which the load Tx is small, the gradient Ktx is relatively large.

Therefore, the effect of the band correction on the estimated load Tx, that is, the amount of the component of a predetermined band appearing as the steering torque Ts is large. Meanwhile, when the load Tx increases, the gradient Ktx becomes relatively small. The effect of the band correction on the estimated load Tx decreases. Because the magnitude of the load Tx and the magnitude of the assistance torque command Ta* are correlated, the effect of the band correction becomes difficult to achieve as the assistance amount increases.

Therefore, a band correction amount is preferably increased as the map gradient Ktx decreases, based on the map gradients Ktx at the operating points of the load Tx. For example, as expressed in the following formula 3, a square root of a reciprocal of the gradient Ktx may be the gradient response gain Gk.

$$Gk = \sqrt{\frac{1}{Ktx}} \qquad \text{[Formula 3]}$$

In the reciprocal calculation, divide-by-zero prevention and upper-lower limit restrictions are preferably performed.

The gradient response gain Gk acquired in this manner is multiplied with the output of the bandpass filter 31. As a result, gain change of the transfer function from the steering wheel torque to the steering torque can be made even. That is, the band correcting unit 30 adjusts the change amount of the transfer function such that the change amount of the transfer function at a specific frequency band is even, relative to the difference in the gradient Ktx of the target steering torque Ts* in relation to the absolute value of the load Tx. Consequently, the driver can experience a satisfactory feel from near a neutral position at which the load Tx is zero to a high-load steering range.

The gain calculator 35 according to another embodiment may multiply the output from the bandpass filter 31 by either of the vehicle-speed response gain Gv and the gradient response gain Gk. Alternatively, the gain calculator 35 may multiply the output from the bandpass filter 31 by a response gain based on characteristics other than the vehicle speed and the gradient. In addition, the present disclosure is not limited to the method in which a filter output is multiplied by a response gain. For example, the correction amount of the transfer function may be adjusted by calculation through use of a map prescribing a relationship between vehicle speed and filter output, or the like.

The adder 38 outputs the post-band-correction estimated load Tx# that is obtained by the output from the gain calculator 35 being added to the inputted estimated load Tx.

Next, a specific example of the transmission characteristics from the steering wheel torque to the steering torque resulting from the band correction will be described with reference to FIGS. 7A and 7B. As comparison, broken lines in FIGS. 7A and 7B indicate the transmission characteristics when the band correction is not performed for the estimated load Tx.

The three lines correspond to the differences in the gradient Ktx in the target steering torque map in FIG. 4. In the band of about 1 Hz to 20 Hz, the gain at the same frequency increases as the map gradient Ktx increases. Specifically, in order from the highest gain, characteristics lines H, M, and L indicate the transmission characteristics when the map gradient Ktx is 0.25, 0.125, and 0.0625, respectively.

Regarding the broken characteristics line H, the gain exceeds 0 [dB] in the band of about 0.8 Hz to 9 Hz. This indicates that the output of the steering torque Ts is amplified in relation to the input of the steering torque Th. In addition, in the band of about 3 Hz and higher regarding the broken characteristics line M, and the band of about 1 Hz and higher regarding the broken characteristics line L, the gain falls below 0 [dB]. This indicates that the output of the steering torque Ts is suppressed in relation to the input of the steering torque Th.

Figure 7A:
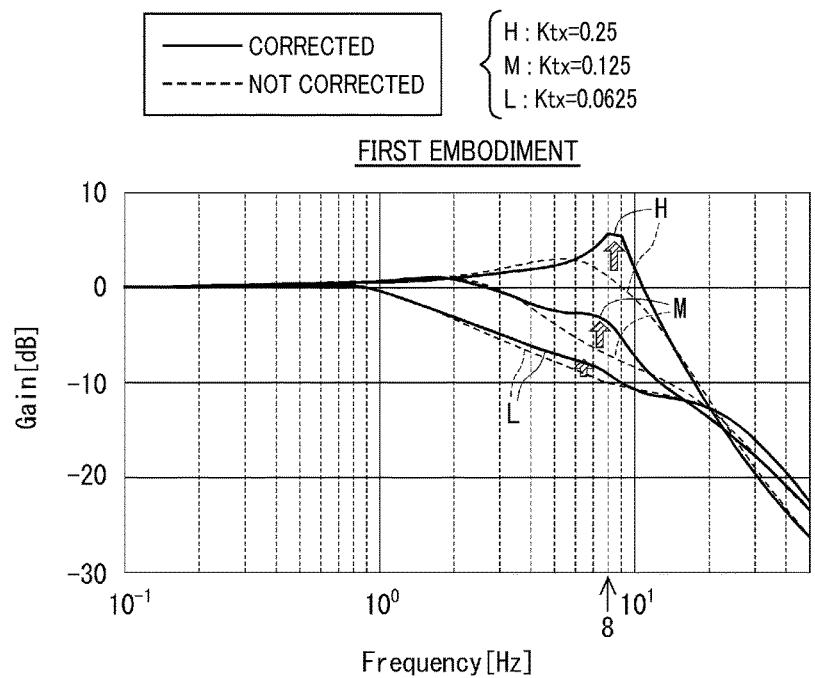
FIG. 7A is a diagram of transmission characteristics from steering wheel torque to steering torque according to the first embodiment.

Solid lines in FIG. 7A indicate the transmission characteristics when the band correcting unit 30 according to the first embodiment performs the band correction for the estimated load Tx. Meanwhile, solid lines in FIG. 7B indicate the transmission characteristics when the compensation amount is added to an assistance command calculated by the controller unit (that is, the servo controller) and correction is performed in the related art in Japanese Patent Publication No. 5533822. The three lines H, M, and L correspond to the three map gradients Ktx, described above, in a manner similar to that of the broken lines.

Here, an attempt is made to increase the gain near 8 Hz and amplify transmission.

Figure 7B:
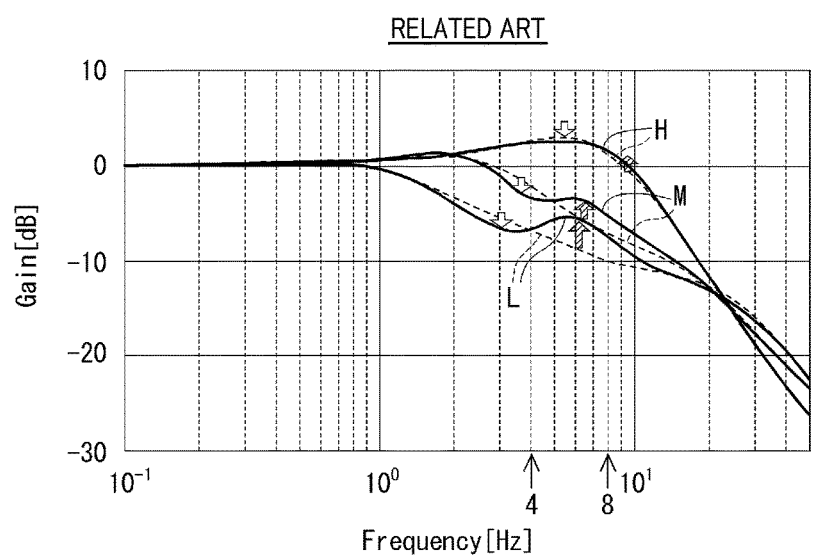
FIG. 7B is a diagram of the transmission characteristics from steering wheel torque to steering torque in a related art.

As shown in FIG. 7B, in the control based on the related art, the center frequency of the bandpass filter is set at about 4 Hz, which is off of the target 8 Hz. As a result, contrary to intentions, the gain in the band of about 1 Hz to 4 Hz decreases, while the gain in the band of about 4 Hz and higher increases. In FIG. 7B, the increase in gain is indicated by a shaded block arrow. The decrease in gain is indicated by a white block arrow. To prevent such situations, the transmission characteristics of the servo controller are required to be minutely adjusted through use of a high-order filter. Adaptation becomes difficult.

In this regard, as shown in FIG. 7A, in the control according to the first embodiment, the center frequency of the bandpass filter can be set to 8 Hz as targeted, regarding all characteristics lines H, L, and M. As a result, the gain in the band near 8 Hz can be locally increased while suppressing changes in characteristics outside of the band near 8 Hz, regardless of the magnitude of the gradient Ktx.

Figure 8:
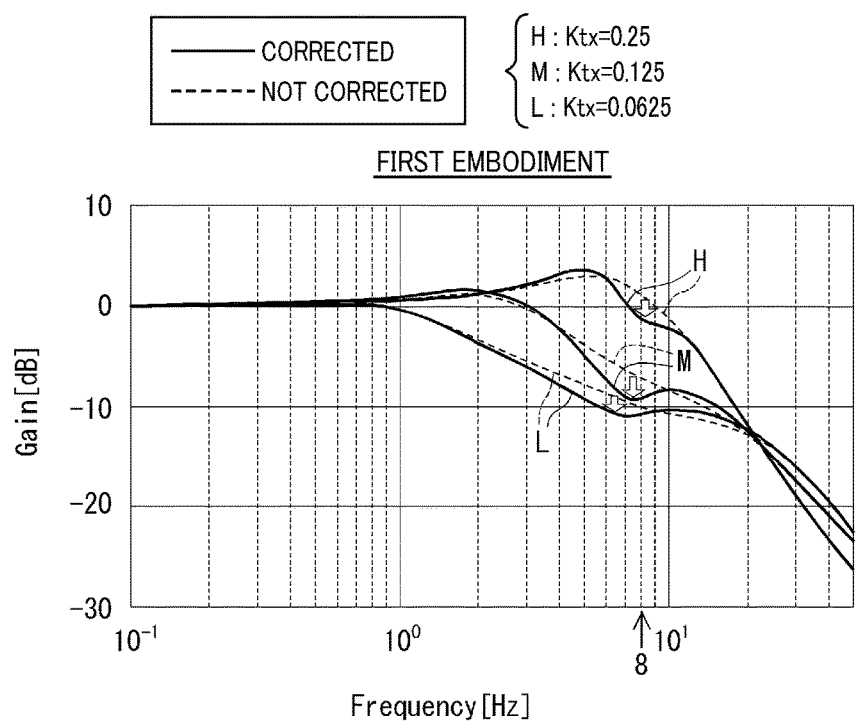
FIG. 8 is a diagram of the transmission characteristics from steering wheel torque to steering torque other than that according to the first embodiment in FIG. 7A.

Here, as described above, as a result of the gradient response gain Gk being set to be greater as the gradient Ktx decreases, and multiplication being performed by the gain calculator 35 of the band correcting unit 30, the effects of the band correction can be sufficiently achieved, even in cases in which the gradient Ktx is relatively small. Therefore, robustness can be ensured regarding the changes in the assistance amount accompanying the changes in the load Tx. In addition, FIG. 8 shows an example in which the gain in the band near 8 Hz is locally reduced and transmission is suppressed by the control according to the first embodiment.

Next, a case in which the band correcting unit 30 corrects the gain of the transmission characteristics from the disturbance torque from a wheel to the steering torque will be similarly described with reference to FIGS. 9A, 9B, and 10.

Figure 9A:
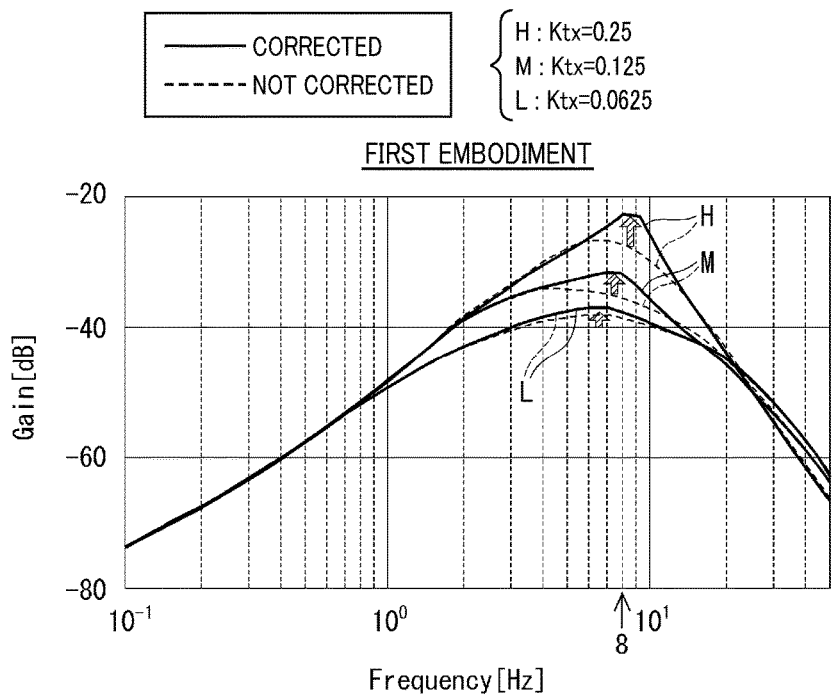
FIG. 9A is a diagram of transmission characteristics from disturbance torque from a wheel to steering torque according to the first embodiment.
Figure 9B:
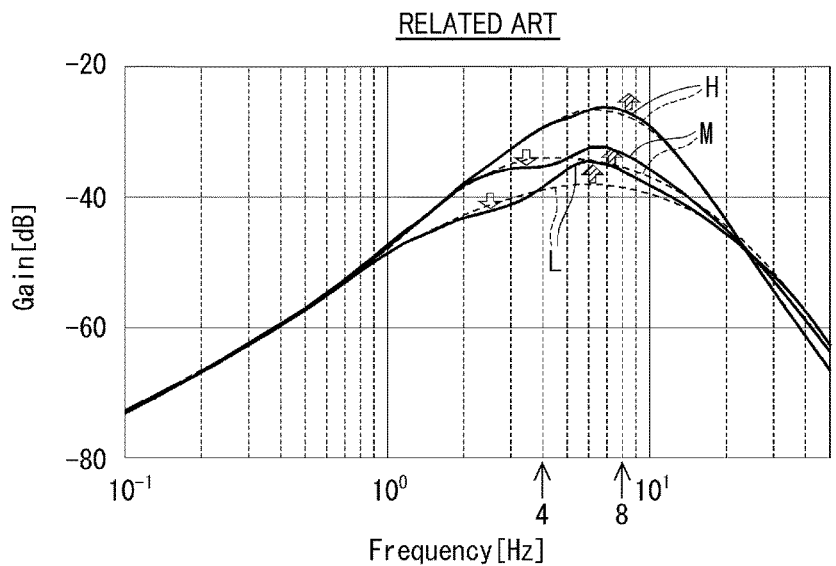
FIG. 9B is a diagram of the transmission characteristics from disturbance torque from a wheel to steering torque in a related art.

FIGS. 9A and 9B respectively correspond to FIGS. 7A and 7B. FIGS. 9A and 9B respectively show the transmission characteristics according to the first embodiment and in the related art. In the control based on the related art shown in FIG. 9B, the center frequency of the bandpass filter is set at about 4 Hz, which is off of the target 8 Hz. As a result, the gain in the band of about 4 Hz and higher increases, and the gain in the band of about 1 Hz to 4 Hz decreases. In this regard, in the control according to the first embodiment shown in FIG. 9A, the center frequency of the bandpass filter can be set to 8 Hz as targeted, and the gain can be locally increased. FIG. 10 corresponds to FIG. 8. FIG. 10 shows an example in which the gain in the band near 8 Hz is locally reduced by the control according to the first embodiment.

As described above, the present embodiment is based on the concept of amplifying-suppressing or enhancing-dampening transmission at a certain band when load information, such as road-surface reaction force, is transmitted to the driver. In addition, the gain of the transmission characteristics at a specific frequency band is corrected in the process of calculation from the load Tx to the target steering torque Ts*.

According to the first embodiment, the frequency band at which the correction for the estimated load Tx is performed and the frequency band at which the transmission characteristics of the steering system mechanism 100 is changed match. Therefore, adaptation is facilitated.

This concept differs from that of the related art in which the desired transmission characteristics are obtained by the compensation amount being added to the assistance amount that is a final command value and correction being performed. According to the present embodiment, correction is performed in the process of calculation from the load Tx to the target steering torque Ts*, rather than addition to a final command value being performed. As a result, the transfer function can be favorably changed to actualize the target transmission amount at the target frequency band, such as to match the senses of the driver. Consequently, adaptation matching the senses, such as adjustment of the feel of connection from the steering wheel to the wheels, is facilitated.

(Second Embodiment)

Figure 11:
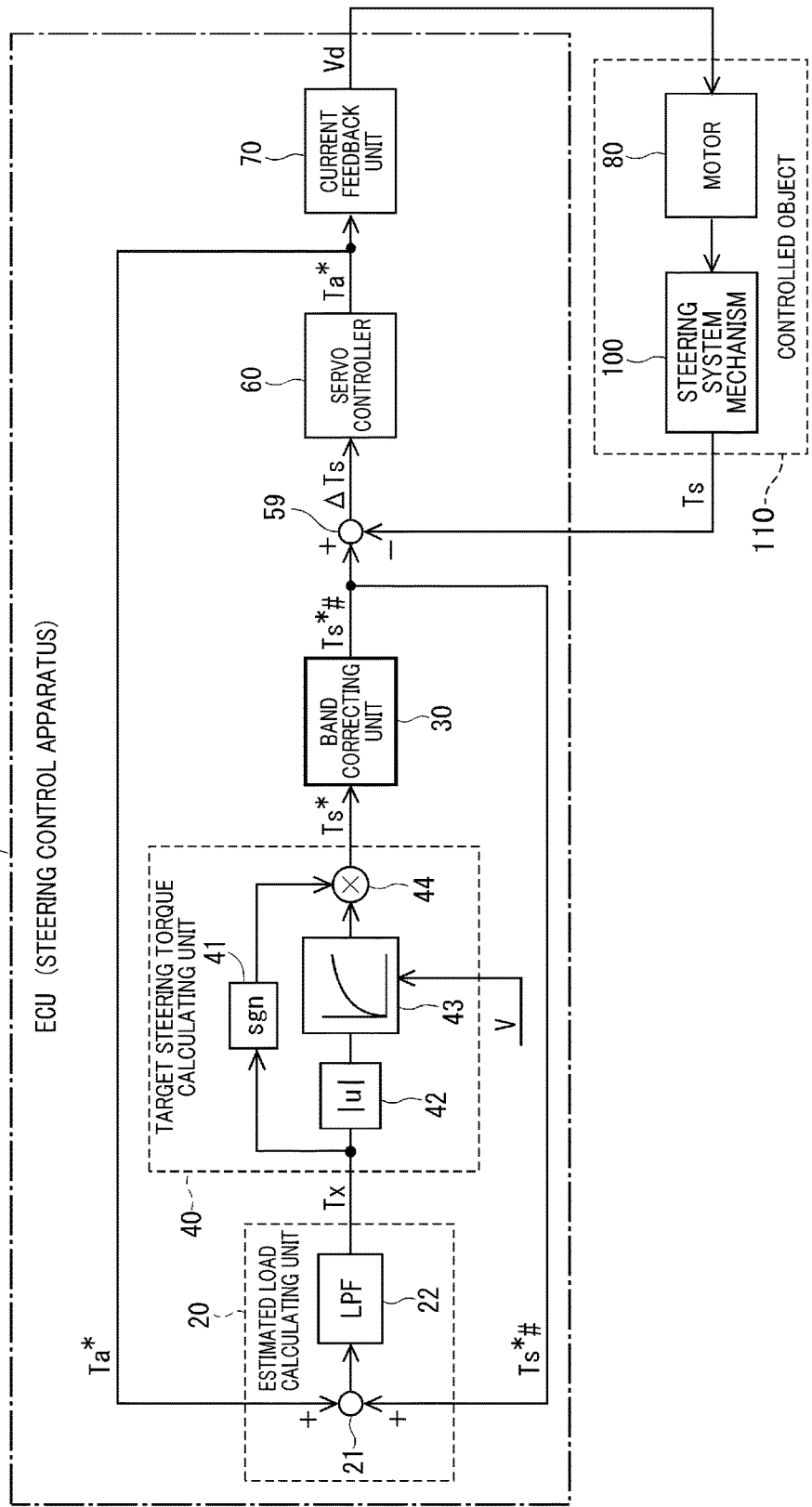
FIG. 11 is a configuration diagram of the ECU (steering control apparatus) according to a second embodiment.

The second embodiment will be described with reference to FIGS. 11 and 12. As shown in FIG. 11, in the ECU 102 according to the second embodiment, the band correcting unit 30 is provided on the output side of the target steering torque calculating unit 40. The estimated load Tx calculated by the estimated load calculating unit 20 is inputted as is, to the target steering torque calculating unit 40.

The band correcting unit 30 corrects the gain of the target steering torque Ts at a specific frequency band, and outputs a post-band-correction target steering torque Ts*#. The post-band-correction target steering torque Ts*# is inputted to the adder 21 of the estimated load calculating unit 20 as information for calculating the estimated load Tx.

Figure 10:
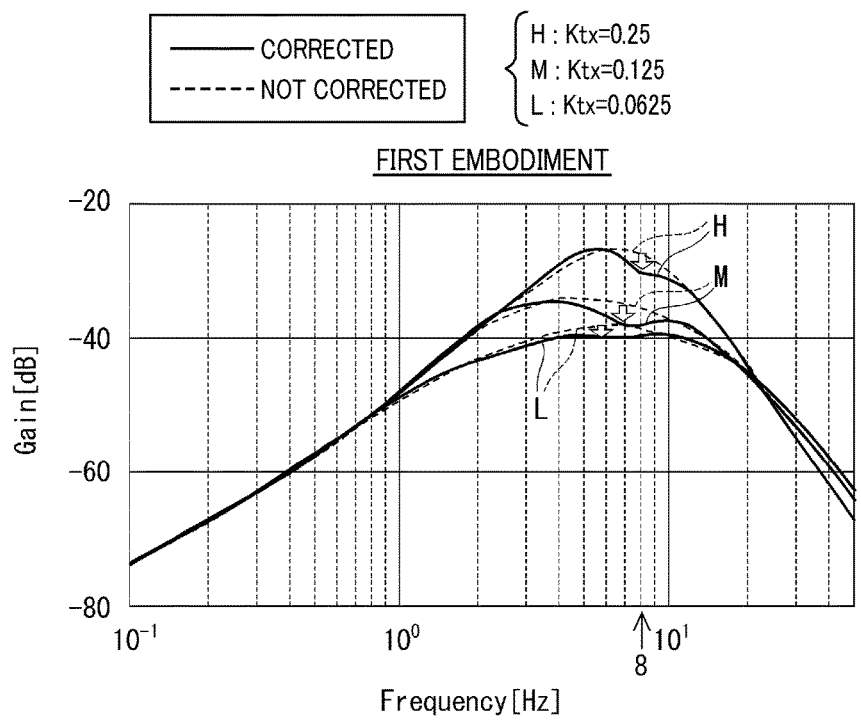
FIG. 10 is a diagram of the transmission characteristics from disturbance torque from a wheel to steering torque other than that according to the first embodiment in FIG. 9A.

In other words, the transmission characteristics from the steering wheel torque to the steering torque shown in FIGS. 7A and 8 and the transmission characteristics from the disturbance torque from a wheel to the steering torque shown in FIGS. 9A and 10 according to the first embodiment similarly appear according to the second embodiment as well. That is, the effect of amplifying or suppressing gain at a specific band and actualizing transmission characteristics matching the senses of the driver is similarly achieved regardless of the position of the band correcting unit 30.

Next, a detailed evaluation of the transmission characteristics according to the first and second embodiments will be described with reference to simulation results expressed by Lissajous waveforms in FIGS. 12A and 12B. The Lissajous waveform expresses a relationship between the steering angle and the steering torque, when steering is performed under the following conditions: sine steering at ±20 degrees from a neutral position of the steering wheel; 0.3 Hz; and high-speed traveling. In addition, a total response gain in the gain calculator 35 of the band correcting unit 30 is 0.5.

Figure 12A:
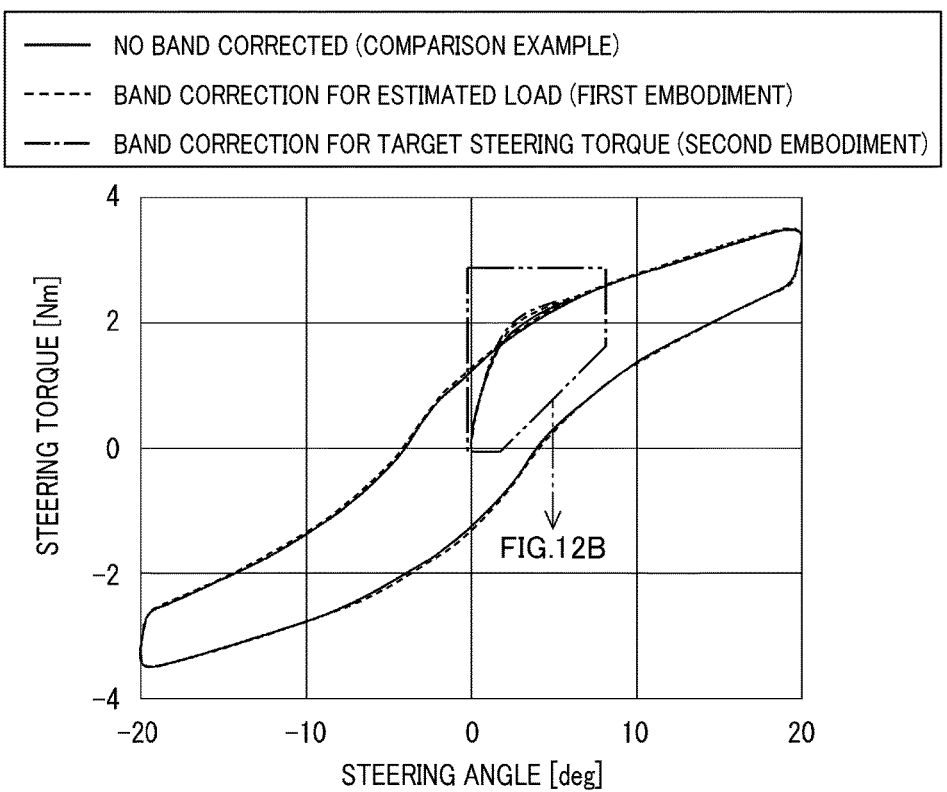
FIGS. 12A and 12B are Lissajous waveform diagrams of band correction according to the first and second embodiments.
Figure 12B:
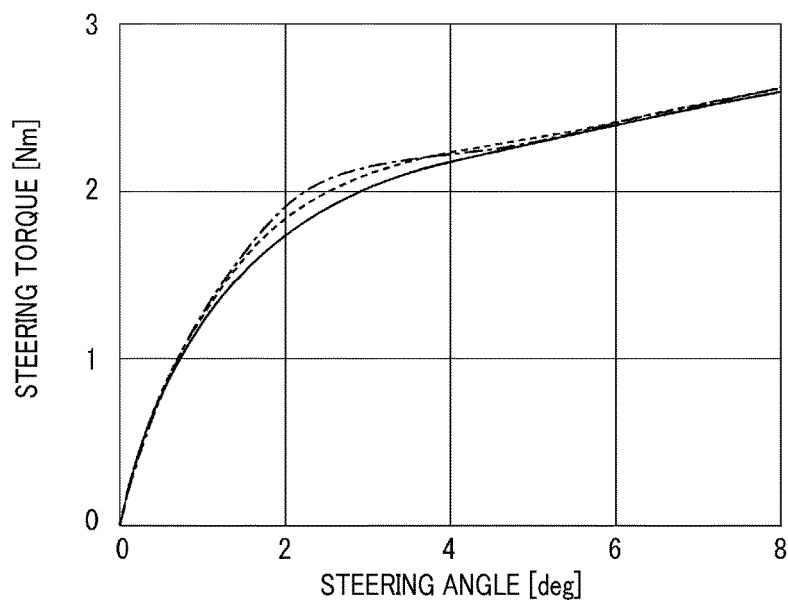

FIG. 12B is an enlarged view of the vicinity of the neutral position at which the steering angle is 0 [deg] and the steering torque is 0 [Nm] in FIG. 12A. A solid line in FIG. 12B shows the Lissajous waveform of a comparison example in which the band correction is not performed. A broken line shows the Lissajous waveform according to the first embodiment in which the band correction is performed for the estimated load Tx. A single-dot chain line shows the Lissajous waveform according to the second embodiment in which the band correction is performed for the target steering torque Ts*.

When the steering wheel is held at the neutral position or near 10 [deg], the gradient at the operation point on the map of the target steering torque Ts* at this time is the gain. Meanwhile, during the process of steering, the operating point moves moment by moment. Therefore, the aspect of the observed steering torque differs slightly between that according to the first embodiment and that according to the second embodiment.

In FIG. 12B, the rising gradients of the steering torque when steering is performed from the neutral point are, in order from the largest, the rising gradient according to the second embodiment, the rising gradient according to the first embodiment, and the rising gradient of the comparison example. That is, a nonlinear change in which the steering torque rises at a steep gradient in the early stage on the map of the target steering torque Ts* and the gradient subsequently becomes gradual when steering is performed from the neutral position, is emphasized by a differential element of the bandpass filter according to the second embodiment. As an effect thereof, a relatively large steering torque appears near the steering angle of 2 to 3 [deg].

In other words, according to the second embodiment, a map shape of the target steering torque Ts* becomes a type of disturbance. The profile at a peak point of a transient steering torque and the periphery thereof changes based on the shape.

The first embodiment and the second embodiment are similar in that, in both cases, the steering torque gradient during a steering transient period is greater than that in the comparison example. However, taking into consideration the fact that the map shape becomes a disturbance, however slightly, according to the second embodiment, it can be said that the first embodiment in which the band correction for the estimated load is performed is preferable. However, the differences in characteristics of this level can be resolved simply by adjustment being performed to match the senses, and is not an issue in actual use.

(Other Embodiments)

(1) As the band correction filter of the band correcting unit 30, the bandpass filter (that is, the quadratic filter) of which the center frequency is the band at which the gain is to be changed is preferably used, as described according to the above-described embodiments. However, when no issues related to facilitation of adaptation and the like are present, a higher-order filter may be used as the band correction filter.

(2) The target steering torque calculating unit 40 according to the above-described embodiments calculates the target steering torque Ts* in relation to the absolute value of the load Tx using only the map of the region in which the load Tx is positive, under a presumption that the target steering torque Ts* is set symmetrically in relation to the positive and negative sides of the load Tx.

However, according to another embodiment, the target torque calculating unit may have a map of the target steering torque Ts* for each of the positive region and the negative region of the load Tx. The target steering torque calculating unit may calculate the target steering torque Ts* in relation to a value of the load Tx including the positive/negative sign. In this case, the differences in steering feel during a right turn and a left turn may be reflected, and the map shapes for the positive and negative regions of the load Tx may be slightly asymmetrical.

(3) As the input to the adder 21 of the estimated load calculating unit 20 in FIG. 1 according to the first embodiment, the steering torque Ts may be used instead of the target steering torque Ts*. In addition, a detection value of the assistance torque may be used instead of the assistance torque command Ta*.

Furthermore, the load calculating unit may be configured, not as the estimated load calculating unit 20 that estimates the load Tx, but as a unit that directly detects the load.

(4) For example, in FIG. 2 of Japanese Patent Publication No. 5533822 and the like, a configuration of a torque correcting unit is described. The torque correcting unit corrects the steering torque Ts based on a motor speed ω. The steering control apparatus of the present disclosure may also include a similar torque correcting unit. In this case, the assistance torque command Ta* in the present specification may instead be read as a base assistance command before addition of a correction torque.

The present disclosure is not limited in any way by the above-described embodiments. Various embodiments are possible without departing from the spirit of the invention.

What is claimed is:

1. A steering control apparatus that controls an assistance torque outputted by a motor connected to a steering system mechanism that generates a steering torque, the steering control apparatus comprising:
    a load calculating unit that estimates or detects, using a processor, a load acting on a steering shaft of the steering system mechanism;
    a target steering torque calculating unit that calculates, using the processor, a target steering torque that is a target value of the steering torque, based on the estimated or detected load;
    a servo controller that calculates, using the processor, a command value of the assistance torque such that a torque deviation that is a difference between the steering torque and the target steering torque is zero; and
    a band correcting unit that includes a band correction filter that extracts a component of a specific frequency band during a process of calculation from the load to the target steering torque, and corrects, using the processor, a gain of a predetermined transfer function in a band extracted by the band correction filter.

2. The steering control apparatus according to claim 1, wherein:
    the band correcting unit uses one or more quadratic filters having a center frequency in the specific frequency band.

3. The steering control apparatus according to claim 2, wherein:

the band correcting unit adjusts a correction amount of the transfer function based on vehicle speed.

4. The steering control apparatus according to claim 3, wherein:
the band correcting unit adjusts a correction amount of the transfer function such that a change amount of the transfer function in the specific frequency band is even relative to a difference in a gradient of the target steering torque in relation to a value of the load or an absolute value of the load.

5. The steering control apparatus according to claim 4, wherein:
the predetermined transfer function includes a transfer function from a steering wheel torque to the steering torque.

6. The steering control apparatus according to claim 5, wherein:
the specific frequency band is set between a spring upper resonance frequency and a spring lower resonance frequency of a vehicle.

7. The steering control apparatus according to claim 1, wherein:
the band correcting unit adjusts a correction amount of the transfer function based on vehicle speed.

8. The steering control apparatus according to claim 1, wherein:
the band correcting unit adjusts a correction amount of the transfer function such that a change amount of the transfer function in the specific frequency band is even relative to a difference in a gradient of the target steering torque in relation to a value of the load or an absolute value of the load.

9. The steering control apparatus according to claim 1, wherein:
the predetermined transfer function includes a transfer function from a steering wheel torque to the steering torque.

10. The steering control apparatus according to claim 1, wherein:
the specific frequency band is set between a spring upper resonance frequency and a spring lower resonance frequency of a vehicle.

11. A steering control method for controlling an assistance torque outputted by a motor connected to a steering system mechanism that generates a steering torque, the steering control method comprising:
estimating or detecting, by a steering control apparatus, a load acting on a steering shaft of the steering system mechanism;
calculating, by the steering control apparatus, a target steering torque that is a target value of the steering torque, based on the estimated or detected load;
calculating, by the steering control apparatus, a command value of the assistance torque such that a torque deviation that is a difference between the steering torque and the target steering torque is zero;
extracting, by a band correction filter provided in the steering control apparatus, a component of a specific frequency band during a process of calculation from the load to the target steering torque; and
correcting, by the steering control apparatus, a gain of a predetermined transfer function in a band extracted by the band correction filter.

\* \* \* \* \*